United States Patent [19]

Towsley

[11] 4,416,040

[45] Nov. 22, 1983

[54] WEAVING LOOM WITH INTERCHANGEABLE SECTIONS

[75] Inventor: John A. Towsley, Ann Arbor, Mich.

[73] Assignee: John Alan Enterprises, Ann Arbor, Mich.

[21] Appl. No.: 268,267

[22] Filed: May 29, 1981

[51] Int. Cl.³ .......................................... D03D 29/00
[52] U.S. Cl. ..................................... 28/152; 403/330; 403/361
[58] Field of Search .................. 28/152; 403/329, 330, 403/361; 46/25, 26

[56] References Cited

U.S. PATENT DOCUMENTS

| 911,846 | 2/1909 | Shuart | 403/329 |
|---|---|---|---|
| 1,859,425 | 5/1932 | Bell | 403/329 |
| 2,433,307 | 12/1947 | Thomas | 28/152 |
| 3,072,938 | 1/1963 | Phaneuf | 403/329 |
| 3,566,531 | 3/1971 | Hasel et al. | 46/25 |
| 3,689,075 | 9/1972 | Adelsohn | 46/26 X |

FOREIGN PATENT DOCUMENTS 243425  6/1960  Australia ............................... 28/152

*Primary Examiner*—Robert Mackey
*Attorney, Agent, or Firm*—Stephenson and Boller

[57] ABSTRACT

A weaving loom comprises a plurality of interchangeable sections forming the loom frame. The sections are separably connected together in end-to-end abutment. The connection between abutting sections is an unique tab and slot construction preventing them from being pulled apart axially but causing the sections to disconnect when one section is twisted downwardly relative to the other section about their abutting ends. Pegs project upwardly from the frame sections, and when the loom is in use, yarn woven around the pegs back and forth between opposite sides of the loom frame prevents the loom sections from becoming disconnected.

4 Claims, 8 Drawing Figures

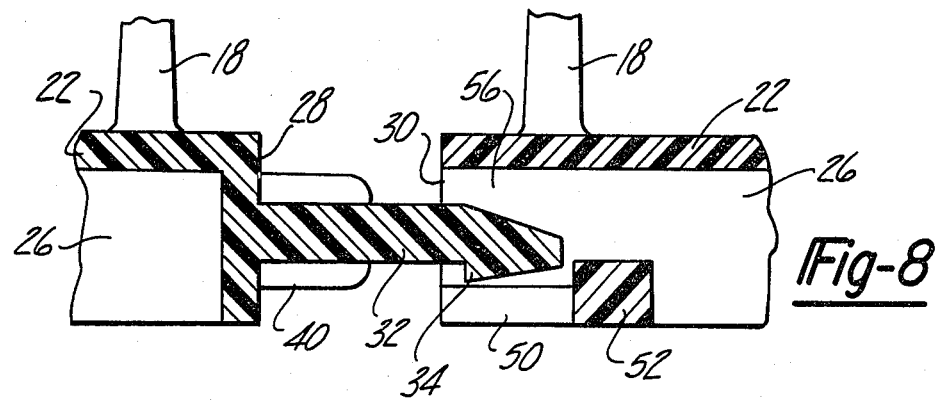
Fig-8
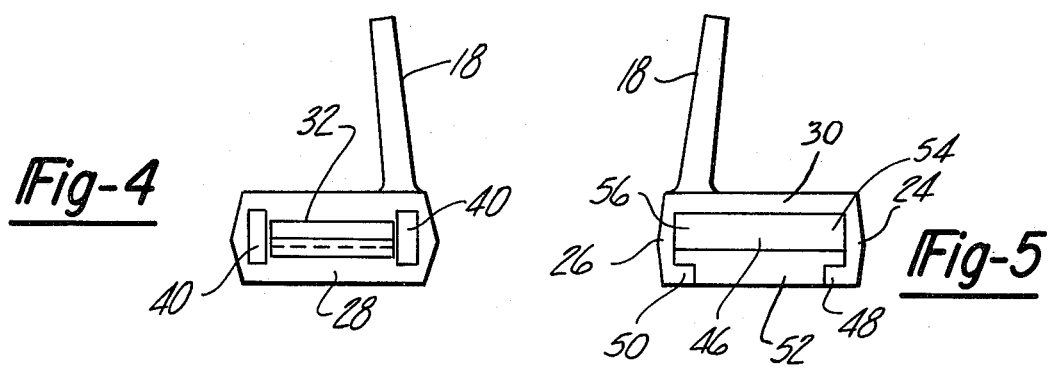
Fig-4
Fig-5
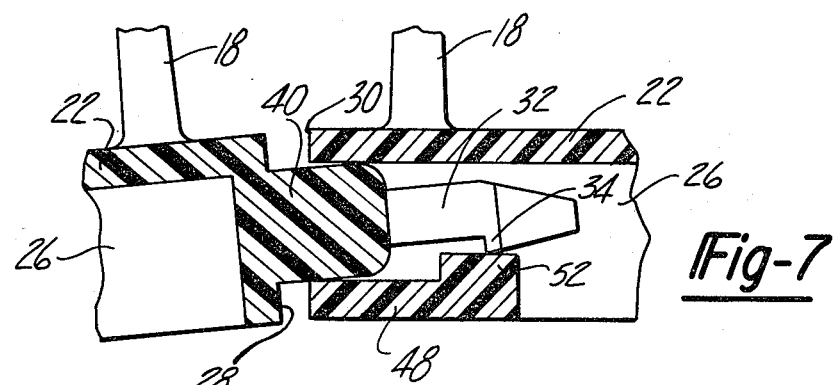
Fig-7
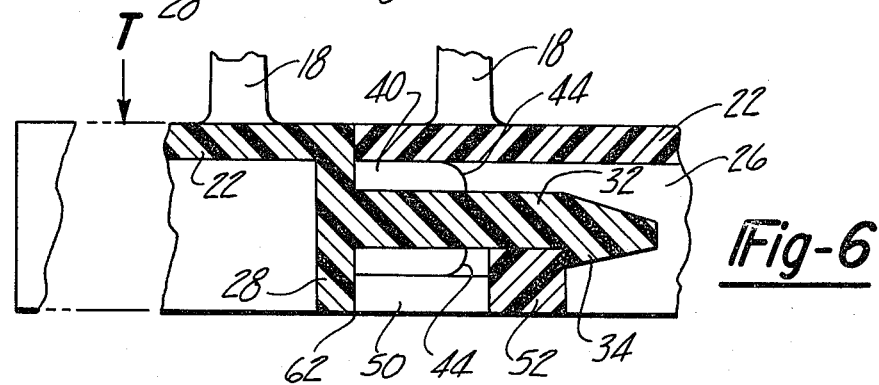
Fig-6

WEAVING LOOM WITH INTERCHANGEABLE SECTIONS

BACKGROUND AND SUMMARY OF THE INVENTION

The present invention relates to weaving looms and is specifically concerned with a new and improved weaving loom comprising individual interchangeable sections forming the loom frame.

Handweaving of articles is a popular hobby. For example, articles such as dish pads, place mats, doilies, wall decorations, coasters and table settings may be woven by hand on a loom which comprises a frame having a shape corresponding to that of the article to be woven. The loom comprises pegs projecting from the frame around which yarn is looped running back and forth between opposite sides of the frame.

The present invention is directed to a new and improved loom which is particularly well-suited for use in handweaving by hobbyists. A loom embodying principles of the present invention possesses a number of significant advantages over prior types of hand looms. One feature of the present invention is that it comprises interchangeable frame sections. The interchangeable frame sections allow various sizes of loom frames to be developed from a relatively small number of unique sections. For example, in the embodiment disclosed herein, the sections include only right angle corner sections and straight side sections. Square and rectangular shapes of various dimensions may be conveniently set up using these interchangeable sections. The invention provides a greater versatility in use of a loom and a savings to the hobbyist, for it means that separate frames for each size and shape of article to be woven are not required.

By using interchangeable loom sections the loom may be packaged in a knock-down form of kit. This greatly facilitates the sales and shipping of looms for it means that the packaging may be more compact. The pegs are arranged in a predetermined pattern on each loom section so that when the interchangeable sections are assembled together into the desired frame size, the pegs on each side of the frame are properly aligned with respect to the pegs on the opposite side.

A still further feature of the invention relates to the details of the connections between the sections. The individual sections are separably connected together in end-to-end abutment by a unique tab and slot construction preventing the abutting sections from being pulled apart axially but causing them to disconnect when one section is twisted downwardly relative to the other section about their abutting ends. This construction and resulting capability makes it particularly convenient to assemble the interchangeable sections into desired frame configurations and also to disassemble the frame after an article has been woven and removed. Another significant feature of the invention is that in spite of the use of separably connected interchangeable sections, the sections are prevented from disconnecting when an article is being woven. This is because the weaving of the yarn around the pegs back and forth between opposite sides of the loom frame tends to hold the loom sections in place, and any attempted disconnection, either intentional or accidental, will be opposed and prevented by the work in progress on the loom. Hence, the frame remains fully assembled, and there is no possibility that work in progress will be lost because of loom sections becoming disconnected. However, once the work has been completed and the woven article removed from the frame, the frame sections may be readily disassembled.

Another benefit is that no separate fasteners are required for the connections nor are any tools required to connect or to disconnect the frame sections.

Briefly, the preferred embodiment of the invention comprises a connection between abutting ends of adjacent sections of the loom frame wherein a tab in the form of a tongue projects from one of the abutting ends of one section into a slot in the abutting end of the other section. A catch at the distal end of the tongue interlocks with a bridge extending across the width of the slot when the two sections are fully assembled in end-to-end abutment. This precludes the two sections from being disconnected by means of axially directed forces, in other words it prevents them from being pulled apart. Additionally, a guide means is provided between the two sections which secures substantial axial alignment of the two sections when connected together, but which is configured to allow the two sections to be disconnected by twisting one of the sections downwardly relative to the other section about their abutting ends. The guide means comprises guided formed on the one section and guideways on the other section. The guideways are spaced on lateral sides of the slot and the guides are spaced on lateral sides of the tongue. The construction of these elements is such that the two sections cannot be conveniently assembled together by axially aligning one with respect to the other and then moving them axially into abutment. Rather, the tongue is initially inserted into the slot with the two sections at a small accute angle with respect to each other. As the two sections are more fully moved toward end-to-end abutment the guides on the one section fit within the guideways of the other section tending to align the two sections axially. The distal end portion of the tongue engages the bridge in such a way that there is a tendency to cam the tongue with respect to the bridge and correspondingly slightly flex the tongue with respect to the end of the sections from which it extends. Continued insertion tends to bring the two sections into more close axial alignment with the acute angle between the two sections progressively diminishing. When the catch clears the bridge the flexing is relieved and the two sections come into substantial axial alignment. When the two sections are to be disconnected, the twisting action referred to above is applied to them thereby disconnecting them in essentially the opposite manner from that in which they were connected.

The foregoing features, advantages and benefits of the invention, along with additional ones, will be seen in the ensuing description and claims which should be considered in conjunction with the accompanying drawings. The drawings disclose a preferred embodiment of the invention according to the best mode presently contemplated for carrying out the invention.

BRIEF DESCRIPTION OF THE DRAWINGS

FIG. 4 is a right hand end view of the loom section of FIG. 2 taken in the direction of arrow 4.

FIG. 5 is a left hand end view of the loom section of FIG. 2 taken in the direction of arrow 5.

FIG. 6 is an enlarged vertical sectional view taken in the direction of arrows 6—6 in FIG. 1.

FIG. 7 is a view similar to FIG. 6 illustrating the relative position of two loom sections during assembly and/or disassembly.

FIG. 8 is a view similar to FIGS. 6 and 7 illustrating a further relative position between the two loom sections.

DESCRIPTION OF THE PREFERRED EMBODIMENT

Figure 1:
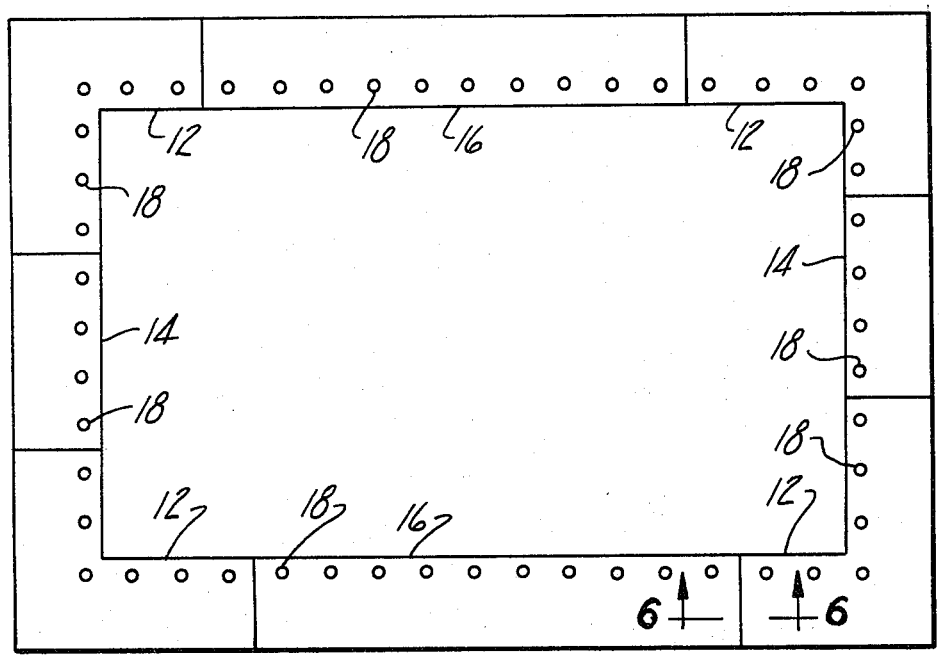
FIG. 1 is a top plan view of a loom embodying principles of the present invention.

FIG. 1 shows a loom in the form of a generally rectangularly shaped frame. The loom comprises a number of individual interchangeable loom sections. The example of FIG. 1 comprises three unique types of sections, namely a corner section 12, a short section 14, and a long straight section 16. In this example, four corner sections 12, two of the short straight sections 14, and two long sections 16 are used. Pegs 18 project upwardly from the main body of each frame section, and when viewed in transverse cross section through the corresponding frame section are canted outwardly from the open center of the frame. In the example, a seven degree cant from the vertical is preferred. In use, yarn or other similar weaving material is run back and forth in a predetermined pattern between opposite pegs of the loom frame so that the article is woven in a desired pattern. Finally, the finished article will assume the overall shape of the loom frame. In the example of FIG. 1, the resultant woven article will have a generally rectangular shape which is suitable for use as a mat or wall decoration or other similar type of article.

The individual loom sections are connected together in end-to-end abutment. A connection is provided between abutting sections which allows the sections to be readily assembled and disassembled without use of separate fasteners or without the use of tools. Furthermore, when the loom sections are assembled into the desired frame shape, and the loom is put to use, the weaving of yarn on the loom frame around the various pegs 18 serves to prevent the sections from being disconnected from each other. Details of the connection can be seen with reference to FIGS. 2-6.

Figure 2:
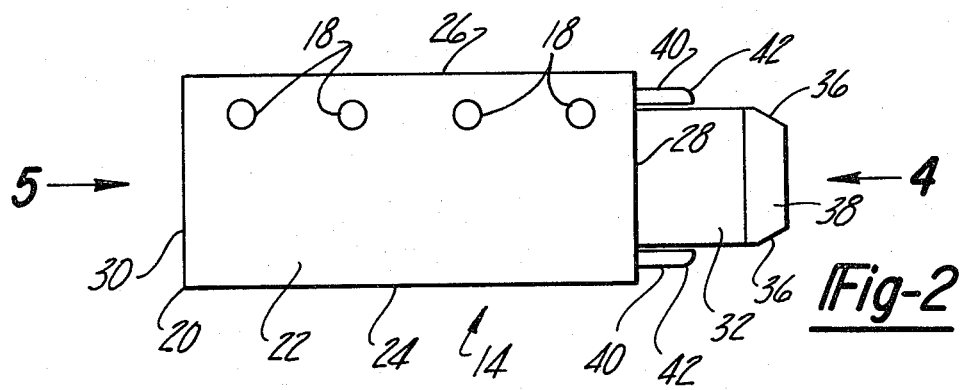
FIG. 2 is an enlarged top plan view of one of the loom sections of FIG. 1 shown by itself.

FIG. 2 illustrates one of the individual sections by itself. For convenience, one of the short straight sections 14 is shown in FIGS. 2-5. The preferred construction involves molding each of the sections from a suitable plastic material by means of a suitable molding process. The specific embodiment of the invention utilizes nylon for its convenience in molding as well as for its durability and attractive appearance. It also allows the pegs to be molded integrally with the main body of each section.

The section 14 comprises a main body 20 which may be considered as having a top wall 22 and side walls 24 and 26, all rectangular in shape. The top wall and two side walls terminate at ends identified by the numerals 28 and 30. Pegs 18 project upwardly from top wall 22. The end 28 is a rectangular wall while the end 30 is an open slot between the top wall and the side walls.

Projecting away from the right hand end wall 28 is a tongue 32 which as viewed in FIG. 2, has a somewhat rectangular shape. At a point on the underside of tongue 32 spaced from end wall 28 is provided a catch 34 which serves to connect section 14 with the open slotted end 30 of an adjacent abutting section in the assembled loom. The distal end of the tongue beyond catch 34 has a tapered configuration with side tapers 36 and top and bottom tapers 38. Also, projecting away from end wall 28 laterally on either side of tongue 32 are guides 40. Guides 40 are shorter than tongue 32. As viewed in FIG. 2, the laterally outboard corner edges at the distal ends of the guides are rounded as indicated by the reference numerals 42. Furthermore, the top and bottom edges at the distal end of each guide are also rounded as shown in FIG. 6 and indicated by the reference numeral 44. As can also be viewed in FIG. 6, the tongue 32 and guides 40 are centered vertically with respect to the end wall 28.

The open slotted left hand end 30 of the loom section comprises a generally rectangularly shaped slot 46 in transverse cross section (FIG. 5). Flanges 48 and 50 extend lengthwise of the section along the lower inside edges of the sidewalls 24, 26. These flanges begin at end 30 and end by merging with a bridge 52 which extends transversely across the loom section between the two sidewalls 24,26. This construction defines guideways having generally rectangular shapes and identified by the reference numerals 54,56, respectively. By way of illustration, guideway 54 is defined by flange 48, the portion of top wall 22 directly overlying flange 48, and the portion of sidewall 24 which is lengthwise coextensive with flange 48.

Figure 3:
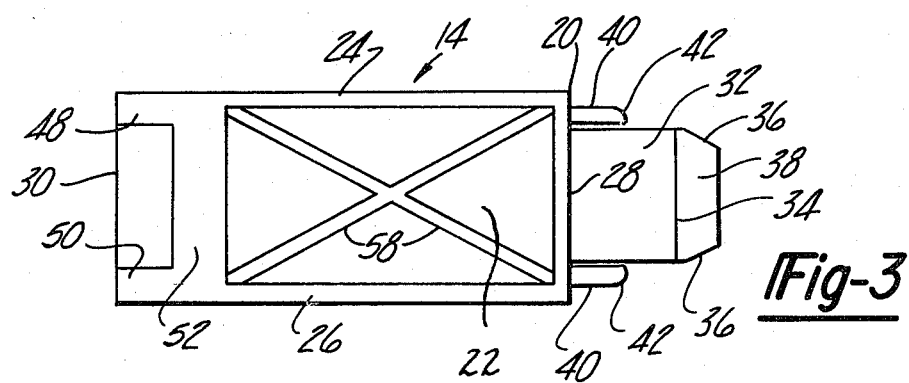
FIG. 3 is a bottom view of the loom section shown in FIG. 2.

Bridge 52, as seen in FIG. 6, has a generally square cross sectional shape. As will be appreciated, the fabrication of the loom section from a molded plastic such as nylon conveniently allows the described structural features to be molded integrally with the section. It may also be desirable to include additional structure serving to strengthen the open channel construction characterizing the basic inverted U-shape cross section of the main body. This is provided by diagonal bracing ribs 58 molded into the underside of the top wall 22, as seen in FIG. 3.

In view of the particular description of section 14, it will be understood that each loom section comprises a slotted end construction like the left hand end of section 14 and a tongue and guide end construction like the right hand end of section 14. Thus, the loom section connections may be considered as belonging to the general class of tab and slot type connections, or tongue and slot type connections.

FIG. 6 illustrates two sections connected together. Catch 34 is seen to be lodged behind the far edge of bridge 52. The end 28 of the one section and the end 30 of the other section are in abutment with each other. The guides 40 of the one section are lodged respectively in the guideways 54 and 56 of the other section. When the two sections are fully connected together as shown in FIG. 6, it is impossible to disconnect them by means of axially applied forces because of the fact that catch 34 is engaged with bridge 52. In other words, they cannot be pulled directly apart. However, the two sections may be conveniently disassembled in a unique manner because of the particular construction resulting from principles of invention.

Although difficult to detect in FIG. 6 because of the scale of the drawing, the vertical dimension of each guide 40 is slightly less than the vertical dimension of the corresponding guideway 54, 56. It should also be pointed out that with the two ends 28 and 30 of the two sections in abutment, there is a very slight axial clearance between the bridge 52 and the catch 34. The procedure for disconnecting the two sections involves twisting one of the sections downwardly relative to the other section about their abutting ends. For example, if the right hand section of FIG. 6 is held in place and a downward twisting force represented by the arrow T is applied to the left hand section, the two sections are readily disconnected. FIG. 7 illustrates an intermediate stage in the disconnection process. The provision of the slight clearances between the guides and guideways and between the catch and bridge allow the left hand section to pivot relative to the right hand section in response to application of the twisting force T. In this instance, the pivot axis will be along the lower edge of end wall 28 of the left hand section where it is in abutment with the lower edge portion of the left hand end 28 of the right hand section. The pivot axis is designated by the reference numeral 62 in FIG. 6.

The disconnection action involves catch 34 swinging upwardly out of engagement with bridge 52 and with the simultaneous pivoting of the guides 40 in the respective guideways 54, 56. The angular extent of the pivotal movement about axis 62 is not particularly large. Once catch 34 clears bridge 52, axial separation of the two sections becomes possible. Consequently, further action results in the two sections assuming a position similar to that shown in FIG. 7. It should be noted that once catch 34 clears bridge 52, no further pivoting occurs and the two sections are separated simply by axially withdrawing one from the other.

The use of a plastic such as nylon is advantageous in that such a material possesses a certain resilience although it is still relatively stiff. This allows the disconnection and separation of connected sections to take place with a single snap-type action in consequence of the initial twisting action which is applied to break the connection.

The procedure for connecting the two sections is essentially the reverse of the disconnection procedure. In explaining the connection procedure, it is useful to address several considerations. First, it should be pointed out that it is difficult to assemble the two sections together by simply axially aligning them and then moving them axially together. That such is true can be recognized from consideration of FIG. 8. If the guides 40 are aligned with the respective guideways 54, 56, which would be required for straight axial assembly, then it will be observed that tongue 32 interferes with bridge 52 in such a way as to preclude such assembly. Hence, in order to fully assemble the two sections together, it is most convenient to position them initially at an angle to each other similar to that shown in FIG. 7. By angling the two sections, it is possible for the distal end of the tongue to clear the leading edge of bridge 52. Continued assembly will be met without any appreciable resistance until the guides 40 begin to enter the guideways 54, 56. It will be remembered that the vertical dimensions of the guide are slightly less than the vertical dimensions of the guideways, and this allows the guides to be inserted into the guideways a certain amount before resistance will be encountered. For example, the relative position of the two sections where appreciable resistance would begin to be encountered would be where the two sections are not quite as fully assembled as in FIG. 7. As increasing resistance is encountered, there is a tendency for the guides to align with the guideways thereby urging the two sections toward axial alignment. Such action, however, is resisted by the resultant downward force of the tongue against the upper surface of the bridge, particularly at the edge of the catch which bears against the upper surface of the bridge as shown in FIG. 7. Once again, the certain limited resilience of the nylon material is advantageous in that the tongue can flex very slightly. The guides however are substantially incapable of flexing. The relative dimensions between the guideways and the guides, coupled with the resiliency of the tongue, slight though it be, are such that the two sections may be brought a point where the catch clears the far edge of the bridge. At this point, the tongue catch snaps into interlocking engagement behind the bridge and the resistance between the guides and the guideways is relieved thereby bringing the two sections into substantial axial alignment as shown in FIG. 6.

In use, an article is woven on the top side of the loom frame by weaving yarn back and forth between opposite sides around the pegs. Accordingly, a significant aspect of the invention is that once an article begins to take form on the top side of the loom, any attempted disconnection of the individual sections will be resisted and prevented by the work in process. This means that accidental disconnection of the loom frame sections is avoided. Such preventive action is beneficial in that accidental loss of the workpiece due to disconnection of the individual sections is thereby avoided.

The illustrated example of the present invention as shown in the drawings, comprises identically constructed connections between abutting sections. In assembling the sections together, the tolerance in the construction of the individual sections at the connection joints is such that it is possible for the final connection closing the frame to be made. In other words, the rectangular form of the frame provides a certain limited amount of freedom allowing the final connection of the sections to be made and without any of the other sections previously connected coming apart. As can be seen in FIGS. 4 and 5, there exists a slight crown in the outside surfaces of the sidewalls, and it will be recognized that such is due to the molding of sections from plastic. While nylon has been mentioned as a suitable material for the loom sections, other plastic materials may also be used. For example a very good material is sold by the General Electric Company under the brand name Lexan.

The fact that each of the corner pieces has an even number of pegs on one side and an odd number of pegs on the other side, and the fact that the even straight sections have an even number of pegs, means an assembled frame will always have an odd number of pegs along each side, the common corner pegs being included in the odd number. This fact is advantageous for weaving particular patterns.

It is contemplated that other shapes of individual frame sections may be constructed in accordance with the present invention to yield frames having other than rectangular shapes. Thus while a preferred embodiment has been disclosed herein, it will be appreciated that principles of the invention are applicable to other embodiments and that such other embodiments are contemplated within the scope of the invention as defined by the following claims.

What I claim is:

1. A weaving loom having a plurality of individual sections connected together in end-to-end abutment to form a closed frame on which an article may be woven wherein said sections include pegs upstanding on said sections and canted outwardly away from the area bounded by the closed frame and wherein at least one of the connections between two abutting sections comprises a resilient tongue on one of said two sections projecting into a slot of the other of said two sections, a catch on the tongue, bridge means on said other section engaged by the tongue catch for rendering said two sections incapable of disconnection by means of an axially applied force, and guide and guideway means on respective ones of said two sections constructed and arranged in relation to each other to axially align said two sections, said guide and guideway means and said tongue catch and bridge means further being constructed and arranged in clearance relation to each other to allow said two sections to be twisted relative to each other about a transverse axis passing through their abutting ends in an amount which allows the tongue catch to clear said bridge means on said other section engaged by the tongue catch thereby to allow said two sections to be disconnected by such twisting.

2. A weaving loom as set forth in claim 1 wherein said guide means comprises a pair of guides on said one section spaced laterally on opposite sides of the tongue, said guideway means comprising a pair of guides within which said guides are received when said two sections are connected together.

3. A weaving loom as set forth in claim 2 wherein said guides are rounded at their distal ends to facilitate the twisting disconnection of said two sections.

4. A loom frame section comprising a main body having ends adapted to abut ends of adjacent sections and connection means at the ends of the main body for connection with adjacent sections, pegs upstanding on said section and canted outwardly thereon, the connection means at one end of the main body comprising a resilient tongue including a catch and guides on opposite lateral sides of the tongue, the connection means at the other end of the main body comprising a slot, guideways in the slot complementary to the guides for reception of like guides of an adjacent abutting section, and a bridge extending transversely across the slot to provide interlocking connection with a like tongue catch of such adjacent abutting section such that said loom frame section and such adjacent abutting section, when connected together, are incapable of being disconnected by means of an axially applied force, said guides and guideways being constructed and arranged in relation to each other to provide axial alignment of said loom frame section and such adjacent abutting section, when connected together, said guides and guideways and said tongue catch and bridge being constructed and arranged in clearance relation to each other to allow said loom frame section and such adjacent abutting section, when connected, to be twisted relative to each other about a transverse axis passing through their abutting ends in an amount which allows the tongue catch of such adjacent abutting section to clear said bridge and allow disconnection of such adjacent abutting section from said loom frame section.

* * * * *